United States Patent
Greive et al.

(10) Patent No.: US 11,882,814 B2
(45) Date of Patent: Jan. 30, 2024

(54) HORIZONTAL FEED STORAGE SYSTEM

(71) Applicant: Perdue Farms, Inc., Salisbury, MD (US)

(72) Inventors: Raymond Paul Greive, Murrieta, CA (US); Jeffrey Lane McDaniel, Murrieta, CA (US); Daniel J. Coady, Temecula, CA (US)

(73) Assignee: Perdue Farms, Inc., Salisbury, MD (US)

( * ) Notice: Subject to any disclaimer, the term of this patent is extended or adjusted under 35 U.S.C. 154(b) by 0 days.

(21) Appl. No.: 17/017,608

(22) Filed: Sep. 10, 2020

(65) Prior Publication Data

US 2021/0092936 A1 Apr. 1, 2021

Related U.S. Application Data

(60) Provisional application No. 62/898,510, filed on Sep. 10, 2019.

(51) Int. Cl.
*A01K 5/02* (2006.01)
*A01K 39/012* (2006.01)

(52) U.S. Cl.
CPC .......... *A01K 5/0258* (2013.01); *A01K 39/012* (2013.01)

(58) Field of Classification Search
CPC .................................................. A01K 5/0258
See application file for complete search history.

(56) References Cited

U.S. PATENT DOCUMENTS

| 2,869,715 | A | | 1/1959 | Williams |
| 2,960,320 | A | | 11/1960 | Heider |
| 3,028,838 | A | | 4/1962 | Haggard et al. |
| 3,115,117 | A | | 12/1963 | Brelsford |
| 3,116,715 | A | * | 1/1964 | Krumheuer .......... A01K 5/0258 |
| | | | | 119/57.2 |

(Continued)

FOREIGN PATENT DOCUMENTS

CN 206951034 U 2/2018

OTHER PUBLICATIONS

International Search Report and Written Opinion in PCT/US2020/050264, dated Nov. 24, 2020.

(Continued)

*Primary Examiner* — Jessica B Wong

(57) ABSTRACT

A horizontal feed storage system may comprise an elongated feed container having a length and a width, wherein the length is at least ten times greater than the width. The elongated feed container may have a fill opening through which the feed is deposited into the elongated feed container and a feed removal opening through which feed is removed from the elongated feed container. The elongated feed container may be movable. The elongated feed container may include multiple conveyance mechanisms disposed within the elongated feed container. The multiple conveyance mechanisms may include a first conveyance mechanism and a second conveyance mechanism, wherein the first conveyance mechanism may displace feed by moving the feed in a first direction away from the fill opening, and/or the second conveyance mechanism may displace feed by moving the feed in a second direction toward the feed removal opening.

13 Claims, 4 Drawing Sheets

(56) References Cited

U.S. PATENT DOCUMENTS

| | | | | | |
|---|---|---|---|---|---|
| 3,119,526 | A | * | 1/1964 | Sutton | A01K 5/0258 222/274 |
| 3,122,277 | A | * | 2/1964 | Kline | B65G 33/36 222/381 |
| 3,173,400 | A | | 3/1965 | Heitsu | |
| 3,199,731 | A | * | 8/1965 | Brauer | A01K 5/0258 222/650 |
| 3,227,264 | A | * | 1/1966 | Best | G01F 13/005 198/582 |
| 3,258,165 | A | * | 6/1966 | Guyer | A01K 5/0258 222/650 |
| 3,263,801 | A | | 8/1966 | Dudte | |
| 3,468,519 | A | * | 9/1969 | Lorenzen | A01K 5/0258 414/268 |
| 3,840,189 | A | * | 10/1974 | Kanengieter | A01K 5/002 241/101.8 |
| 4,089,300 | A | * | 5/1978 | Keen | A01K 5/0258 198/662 |
| 4,334,502 | A | | 6/1982 | Cox | |
| 4,432,499 | A | * | 2/1984 | Henkensiefken | B01F 33/5023 241/101.8 |
| 4,890,577 | A | * | 1/1990 | Maibach | A01K 5/02 119/52.1 |
| 5,275,129 | A | | 1/1994 | Vigesaa | |
| 5,439,182 | A | * | 8/1995 | Sgariboldi | B01F 27/60 241/260.1 |
| 5,524,796 | A | | 6/1996 | Hyer | |
| 5,533,677 | A | * | 7/1996 | McCaffrey | A01C 3/06 239/677 |
| 5,816,191 | A | * | 10/1998 | Beaudoin | A01K 5/0258 119/51.02 |
| 5,967,427 | A | * | 10/1999 | Seymour | B01F 33/5023 239/679 |
| 6,199,781 | B1 | * | 3/2001 | Hruska | A01F 29/005 241/604 |
| 10,336,552 | B1 | * | 7/2019 | Steinbrueck | A01K 5/02 |
| 2009/0008223 | A1 | * | 1/2009 | Fujii | A01K 5/0208 198/813 |
| 2011/0180642 | A1 | * | 7/2011 | Newswanger | B01F 35/754551 241/101.8 |
| 2012/0104032 | A1 | * | 5/2012 | Bahn | A01K 5/0258 222/2 |
| 2012/0269028 | A1 | * | 10/2012 | Gordon | B01F 35/4122 366/156.2 |
| 2013/0146619 | A1 | * | 6/2013 | Ozawa | B65G 65/46 222/236 |
| 2013/0186343 | A1 | * | 7/2013 | Gordon | B01F 35/4122 119/57.92 |
| 2013/0276709 | A1 | * | 10/2013 | Ryder | A01K 5/0258 119/51.01 |
| 2013/0298837 | A1 | * | 11/2013 | Weelink | A01K 5/0258 119/51.02 |
| 2013/0327277 | A1 | * | 12/2013 | Aton | A01K 5/002 119/57.92 |
| 2014/0261199 | A1 | * | 9/2014 | Rose | A01K 5/0258 119/53 |
| 2016/0219831 | A1 | * | 8/2016 | Van Den Berg | A01D 87/003 |
| 2016/0227738 | A1 | * | 8/2016 | Ausman | A01K 5/0142 |
| 2017/0303503 | A1 | * | 10/2017 | Mannebeck | A01K 5/0283 |

OTHER PUBLICATIONS

International Preliminary Report on Patentability in PCT/US2020/050264, dated Mar. 15, 2022.

International Preliminary Report on Patentability for Application No. PCT/US2020/050264, dated Mar. 24, 2022, 7 pages.

* cited by examiner

Types of Feed Conveyance

-Auger

-Cablevey

-Chain Feed

-Flex auger

HORIZONTAL FEED STORAGE SYSTEM

FIELD

The disclosure relates to a horizontal feed storage system.

BACKGROUND

Conventional poultry and swine production use stationary facilities. Due to their stationary nature, poultry/swine in conventional systems often live on dirty litter and/or fecal matter. As such, conventional poultry/swine may experience compromised immune system function leading to decreased performance, low animal welfare, and potentially require the use of vaccines, antibiotics, drugs, ionophores, and other interventions to maintain animal health. Stationary poultry/swine systems also require significant manure management systems including manure lagoons, litter, and/or waste disposal/removal which lead to high materials costs, elevated labor costs, and environmental concerns. Furthermore, poultry/swine that are treated with vaccines, drugs, antibiotics, or other interventions may subsequently lead to negative health effects on humans that consume their meat and/or eggs. Mobile poultry/swine coops solve these issues but present issues with feed storage.

Typically, feed is stored in a silo or other stationary storage container on a field. A weeks' worth of feed for thousands of poultry/swine is extremely heavy and may weigh over 20,000 pounds. As such, the feed storage container can't just be moved over a field because it's too heavy and the weight is too concentrated. In fact, a concrete pad may be necessary to prevent the stationary silo or storage container from sinking due to its immense weight.

SUMMARY

A horizontal feed storage system may solve some of the aforementioned issues. The horizontal feed storage system may comprise an elongated feed storage container. The horizontal feed storage system may be mobile and/or moveable. The horizontal feed storage system may move along with and/or in conjunction with a mobile poultry and/or swine enclosure. The mobile poultry and/or swine enclosure may comprise a poultry coop or house and/or a swine house/enclosure. The horizontal feed storage system may distribute the weight of feed across an elongated feed container such that the horizontal feed storage system is movable and/or mobile. The length (20-1,500 feet or more) and/or elongated shape of the feed container may allow the weight of the feed to be equalized and enable the elongated feed container and/or horizontal feed structure to be moved. The elongated feed container may be longer than it is wide. In some implementations, the length of the elongated feed container may be ten to hundreds of times greater than the width. By way of non-limiting example, in one example implementation, the horizontal feed storage system may be around 3 feet high, 3 feet wide, and/or 200 feet long.

By way of non-limiting example, the horizontal feed storage system may have a feed capacity of enough feed for thousands of broilers once per week. As such, the feed storage may not have to be filled and/or emptied multiple times per week.

The weight of elongated feed container may be distributed such that it doesn't sink or have to have a reinforced structure in the building, as previously existing feed storage systems do. Filling and/or emptying an elongated feed storage container may be facilitated by multiple feed conveyance mechanisms. A first conveyance mechanism or set of conveyance mechanisms may displace the feed throughout the elongated feed container by moving the feed from the fill opening towards the opposite end(s) of the elongated feed container. A second conveyance mechanism or set of conveyance mechanisms may bring the feed from throughout the elongated feed container to an opening for emptying feed (e.g., feed removal opening) and/or from the ends of the elongated feed container to the feed removal opening.

In some implementations, the first conveyance mechanism and/or first set of conveyance mechanisms may move the feed in an opposite direction as the second conveyance mechanism or second set of conveyance mechanisms. In some implementations, a portion of the first set of conveyance mechanisms may move the feed in an opposite direction as the corresponding portion of the second set of conveyance mechanisms. In some implementations, the first conveyance mechanism and/or first set of conveyance mechanisms may move the feed in the same direction as the second conveyance mechanism or second set of conveyance mechanisms.

In one non-limiting use example, the conveyance mechanisms may be augers. A first auger may run the length of the elongated feed container at the top portion of the elongated feed container. A second auger may fun the length of the elongated feed container at the bottom portion of the elongated feed container. Continuing the non-limiting use example, the first auger may carry the feed from the feed fill opening to the opposite end of the elongated feed container, thus enabling filling the entire elongated feed container from a single point.

In some implementations, the first auger and/or sets of augers may be located within a tube and/or a semicircular tube. The tube may be open at the top and/or bottom, and/or comprise multiple openings. The location of the opening(s) in the tube having the first auger located within may determine the maximum feed fill level for the elongated feed container. By way of non-limiting use example, if the top of the tube for the first auger is open, the maximum feed fill level may be higher than if the bottom of the tube for the first auger is open and the top is closed.

In some implementations, gravity may cause the feed to flow to the bottom of the elongated feed container. The second auger and/or set of augers may capture the gravity flow to the bottom of the elongated feed storage container and/or move the feed toward an exit point (e.g., feed removal opening). In some implementations, the feed removal opening may be located on the same side as the fill opening, an opposite side as the fill opening, and or anywhere along the length of the elongated feed container. In some implementations, there may be multiple feed removal openings.

Continuing the non-limiting use example, a separator (e.g., auger separator) may separate the first auger or set of augers, and the second auger or set of augers. The separator may be opened gradually when emptying the horizontal feed storage system to only allow a small portion of the feed access to the auger and/or feed conveyance mechanism. The separator may comprise a tube and/or a semi-circular tube with the second auger and/or set of augers displaced inside. The separator may be any material that can withstand the weight of feed on top of it. In some implementations, the separator may be the same material or a different material as the elongated feed container.

In some implementations, the elongated feed container may have a triangular-shaped bottom and/or a rounded triangular shaped bottom. In some implementations, the sides of the elongated feed container may be slanted to prevent built-up of the feed along the sides of the elongated feed container. The slanted sides of elongated feed container may enable the feed to flow with gravity and a bridge to form when a void forms under the feed responsive to the auger moving feed below. By way of non-limiting example, the sides of the elongated feed container may be angled at around a 60 degree angle, and/or any other angle suitable for preventing buildup.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1A:
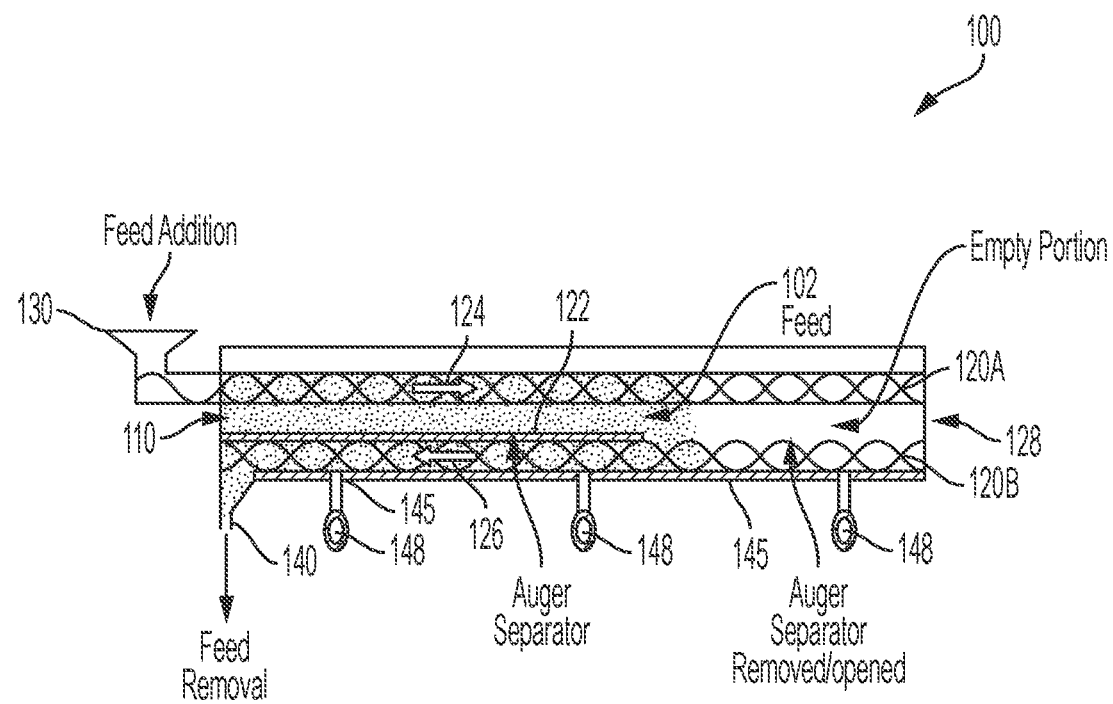
FIG. 1A illustrates a side view of horizontal feed storage system 100, in accordance with one or more implementations.

FIG. 1A illustrates a side view of horizontal feed storage system 100, in accordance with one or more implementations. Horizontal feed storage system 100 may comprise an elongated feed container 125. Elongated feed container 125 may have multiple sides. Elongated feed container 125 may be 20-300 ft in length. Elongated feed container 125 may be 2-30 feet wide. In some implementations, elongated feed container may be 2-5 feet wide and/or 50-200 feet in length.

Horizontal feed storage system 100 may comprise one or more feed conveyance mechanisms 120. Feed conveyance mechanisms 120 may displace the feed within the elongated feed container 125 such that the feed is distributed throughout elongated feed container 125. Conveyance mechanisms 120 may facilitate movement of the feed from one end of elongated feed container 125 to the other, and/or throughout elongated feed container 125. In some implementations, a first conveyance mechanism 120A may displace feed within elongated feed container 125 in the direction of arrow 124. A second conveyance mechanism 120B may displace feed within elongated feed container 125 in the direction of arrow 126. Together, first conveyance mechanism 120A and second conveyance mechanism 120B may distribute the feed from one end of elongated feed container 125 to the other, and/or facilitate filling and emptying of elongated feed container 125.

Elongated feed container 125 may be made of metal, plastic, and/or any other non-porous, lightweight and/or smooth material. By way of non-limiting example, elongated feed container 125 may be made of galvanized sheet metal and/or another material.

Figure 1B:
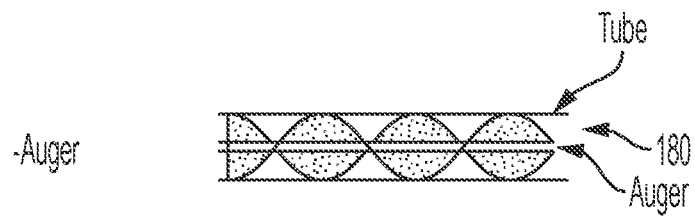
FIG. 1B illustrates some example conveyance mechanisms 120, in accordance with one or more implementations.
Figure 1B:
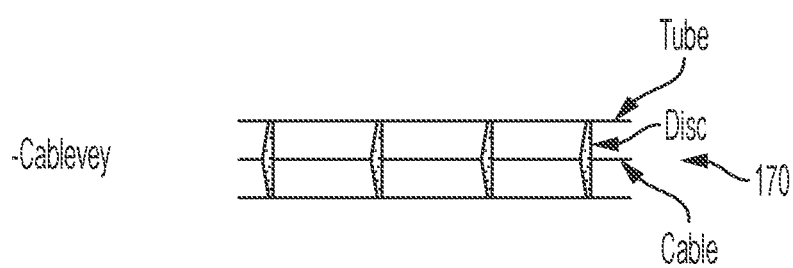
Figure 1B:
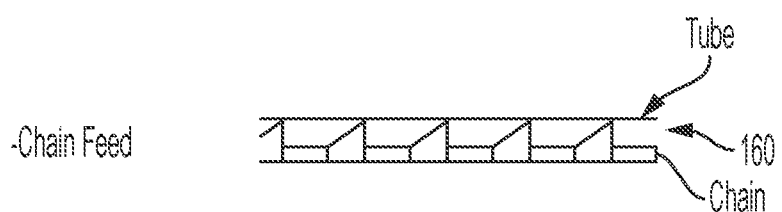
Figure 1B:
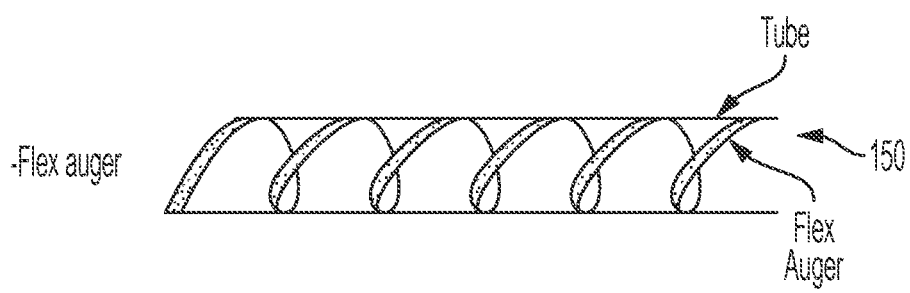

FIG. 1B illustrates some example conveyance mechanisms 120, in accordance with one or more implementations. Feed conveyance mechanisms 120 may comprise one or more augers 180, cablevey conveyors 170, chain feeds 160, flex augers 150, and/or other conveyance mechanisms.

Returning to FIG. 1A, horizontal feed storage system 100 may include separator 122. Separator 122 may be disposed between first conveyance mechanism 120A and second conveyance mechanism 120B. Separator 122 may be configured to prevent overloading of the conveyance mechanisms 120. Separator 122 may be removed and/or opened as elongated feed container 125 is filled and/or emptied. By way of non-limiting example, the conveyance mechanisms may move feed from the furthest point first. As such, separator 122 may be opened beginning at the furthest point from the feed exit point, and continually open sections approaching to the feed exit point as feed is emptied. This opening may continue until all separator partitions have been opened and all feed can be released to second conveyance mechanism 120B. Separator 122 may be fabricated from the same material and/or a different material as horizontal feed storage system 100.

In some implementations, horizontal feed storage system 100 may include feed fill opening 130 and/or feed removal opening 140. As feed enters horizontal feed storage system 100, first conveyance mechanism 120 may move the feed from fill opening 140 throughout elongated feed container 125. Feed may be distributed from fill opening 130 to an opposite end of the feed container. Feed may be emptied from feed removal opening 140 via second displacement mechanism 120B. Gravity may cause the feed to fall into second displacement mechanism 120B and bring the feed to feed removal opening 140.

Feed fill opening and/or feed removal opening may be located anywhere on elongated feed storage container 125. For example, fill opening and/or removal opening may be located at the same end of feed storage container 125, at opposite ends of feed storage container 125, in the middle of feed storage container 125, and/or anywhere else alone feed storage container 125.

In some implementations, horizontal feed system may comprise more than two feed displacement mechanisms. For example, if the fill opening is located in the center of elongated feed container, multiple feed displacement mechanism may be located in the top portion of the elongated feed container and displace the feed within the elongated feed container during filling. Multiple feed displacement mechanisms may bring the feed from throughout the elongated feed container back to the center to empty out of an empty feed opening in the center (or elsewhere) of elongated feed container.

Horizontal feed storage system 100 may comprise a chassis 145. Chassis 145 may be coupled to elongated feed container 125. Chassis 145 may have multiple wheels 148 that facilitate movement of horizontal feed storage system 100. The horizontal feed storage system may be movable and/or mobile. The horizontal feed storage system may move over a field. In some implementations, chassis 145 may be a chassis for the poultry and/or swine enclosure such that horizontal feed storage system is coupled to the poultry and/or swine enclosure which includes a chassis.

In some implementations, chassis 145 may be coupled to a movable poultry and/or swine enclosure. As such, horizontal feed storage system 100 may move with the movable poultry and/or swine enclosure. In some implementations, the horizontal feed container may be part of and/or integrated with the movable poultry and/or swine enclosure. By way of non-limiting example, the horizontal feed container may be incorporated into the structure of the movable poultry and/or swine enclosure and/or coupled to the movable poultry and/or swine enclosure. By way of non-limiting example, the horizontal feed container may be coupled to any point on any wall and/or ceiling portion of the movable poultry and/or swine enclosure, to an interior side of the movable poultry and/or swine enclosure, suspended from the ceiling and/or trusses of the enclosure, coupled to the exterior of the enclosure, and/or coupled anywhere else on the enclosure. In some implementations, horizontal feed storage system 100 may be located within and/or outside the poultry and/or swine enclosure.

Figure 2:
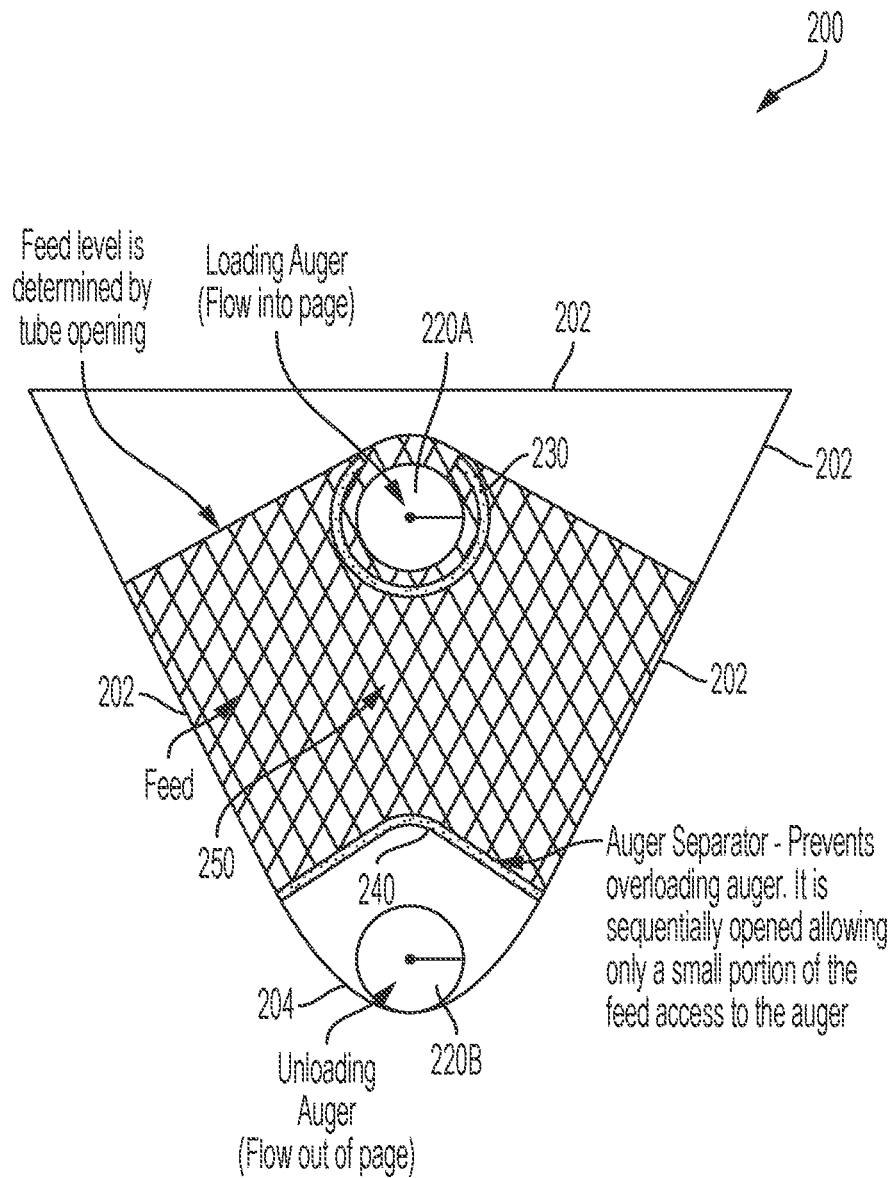
FIG. 2 illustrates a cross section view of elongated feed container 200, in accordance with one or more implementations

FIG. 2 illustrates a cross section view of elongated feed container 200, in accordance with one or more implementations. Elongated feed container 200 may have slanted side walls 202 connected via a rounded bottom 204. Elongated feed container 200 may have an upside-down, rounded, triangular-shaped cross section.

First displacement mechanism 220A may be disposed within a tube 230 and/or partial tubes. Separator 240 may prevent overloading of displacement mechanisms 220.

Figure 3:
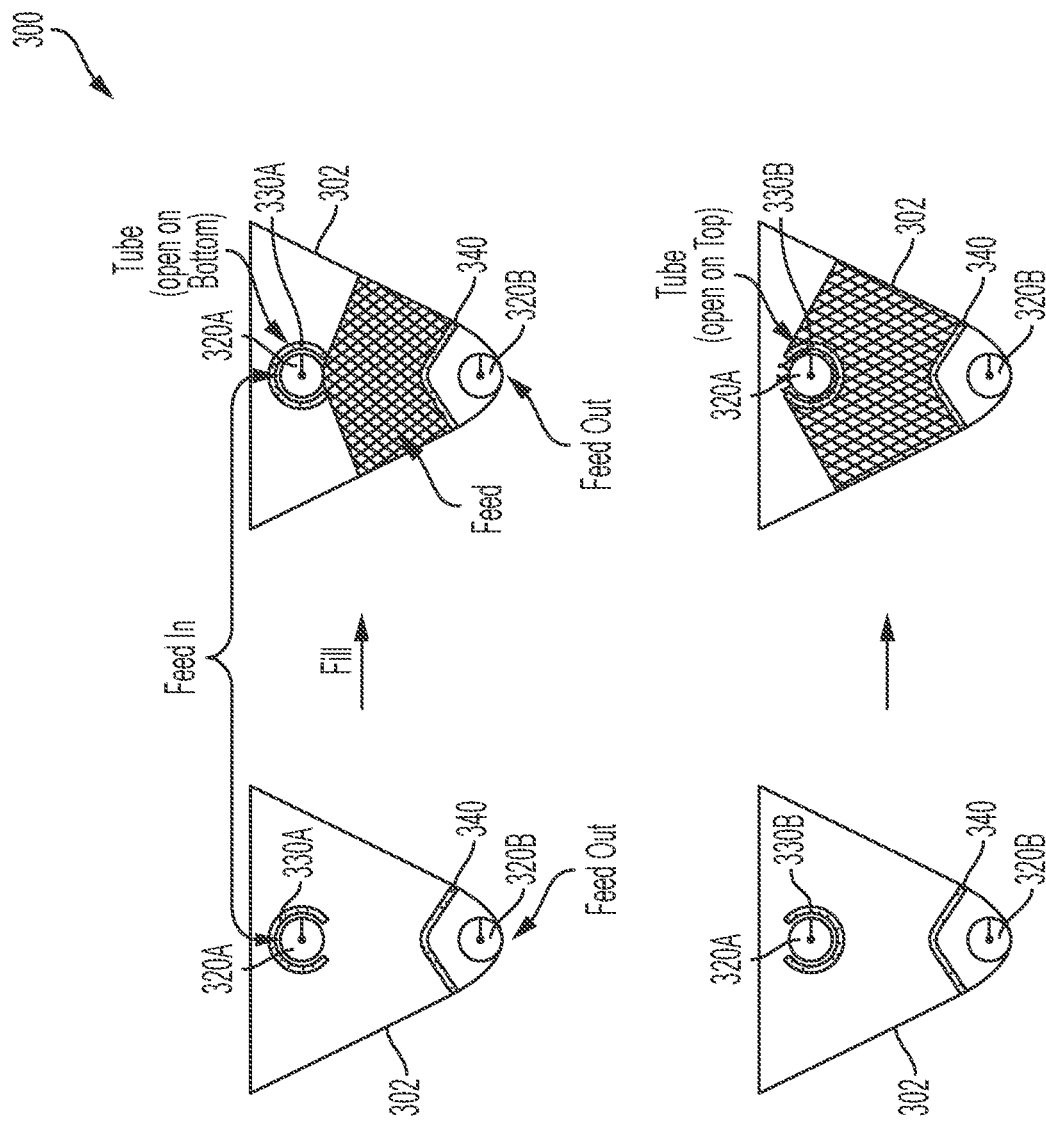
FIG. 3 illustrates a cross section view of elongated feed container 300, in accordance with one or more implementations.

FIG. 3 illustrates a cross section view of elongated feed container 300, in accordance with one or more implementations. To fill and/or empty elongated feed container 300, displacement mechanisms 320 may turn and/or move within a tube 330 to displace the feed. In some implementations, first displacement mechanism 320A may be disposed within a tube 330A. Tube 330A may be open at the bottom to enable feed to fall out of the tube gradually via gravity. Tube 330B may be open at the top. When first displacement mechanism 320A turns within tube 330B, the feed may be pushed up against the interior of tube 320A and fall out of the opening at the top, filling elongated feed container 300.

In some implementations, the entire bottom and/or top of tube 330 may be open. In some implementations, tube 330 may have any number of open portions along the length of tube 330. Whether tube 330 is open at the top or bottom may indicate the feel level of elongated feed container 300.

In some implementations, the elongated feed container may have a rectangular shaped top portion. In some implementations, the elongated feed container may have a triangular bottom portion. Elongated feed container may have any shape and/or structure that enables the feed container to hold feed in a delocalized manner such that the weight of the feed is distributed across the whole container.

In some implementations, the horizontal feed storage system may include a motor and/or one or more processors configured by machine-readable instructions to actuate the motor. Actuating said motor may cause the horizontal feed storage system to move across a field. The one or more processors may be programmed to actuate the motor and/or cause the horizontal feed storage system to move in a linear and/or lateral manner. In some implementations, the horizontal feed storage system may move in accordance with a schedule and/or predetermined speed. In some implementations, the schedule and/or predetermined speed may indicate when the horizontal feed storage system will move, a duration and/or multiple durations the horizontal feed storage system will move, a speed at which the horizontal feed storage system will move, and/or other characteristics of the movement of the horizontal feed storage system. This schedule may be consistent, or may be adjusted according to the age, size, quantity, manure, and/or lifecycle of the poultry and/or swine, and/or seasonal conditions.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A horizontal feed storage system configured to move feed throughout an elongated feed container, the horizontal feed storage system comprising:

an elongated feed container configured to store feed for one or both of poultry and other livestock, the elongated feed container having a length and a width wherein the length is at least ten times greater than the width, and the elongated feed container having a fill opening through which the feed is deposited into the elongated feed container and a feed removal opening through which feed is removed from the elongated feed container, wherein the fill opening is located closer to a top of the elongated feed container relative to the feed removal opening, and wherein the elongated feed container is coupled to a mobile poultry enclosure and movable via one or more wheels coupled to the elongated feed container such that responsive to the mobile poultry enclosure moving, the horizontal feed storage system and the elongated feed container move;

multiple conveyance mechanisms disposed within the elongated feed container, the multiple conveyance mechanisms including a first conveyance mechanism and a second conveyance mechanism, wherein the first conveyance mechanism is disposed above the second conveyance mechanism within the elongated feed container, and wherein the first conveyance mechanism displaces feed throughout the elongated feed container by moving the feed in a first direction, away from the fill opening, within the elongated feed container and the second conveyance mechanism displaces feed throughout the elongated feed container by moving the feed in a second direction within the elongated feed container toward the feed removal opening.

2. The horizontal feed storage system of claim 1, wherein the horizontal feed storage system is incorporated into a structure of a movable poultry enclosure or a movable swine enclosure.

3. The horizontal feed storage system of claim 1, further comprising a chassis, wherein the one or more wheels coupled to the elongated feed container are coupled to the elongated feed container via the chassis.

4. The horizontal feed storage system of claim 1, wherein the elongated feed container has slanted side walls connected via a rounded bottom.

5. The horizontal feed storage system of claim 1, wherein the elongated feed container has an upside-down, rounded, triangular shaped cross section.

6. The horizontal feed storage system of claim 1, wherein the fill opening and the feed removal opening are closer to a first end of the elongated feed container.

7. The horizontal feed storage system of claim 1, wherein the fill opening is closer to a first end of the elongated feed container than a second end and the feed removal opening is closer to the second end of the elongated feed container than the first end.

8. The horizontal feed storage system of claim 1, wherein one of both of the first feed conveyance mechanism and the second feed conveyance mechanism comprise one or more of an auger, a cablevey conveyor, a chain feed, and a flex auger.

9. The horizontal feed storage system of claim 1, wherein the first direction within the elongated feed container that is away from the fill opening, is opposite of the second direction within the elongated feed container that is toward the feed removal opening.

10. The horizontal feed storage system of claim 1, wherein the first displacement mechanism is disposed within a tube.

11. The horizontal feed storage system of claim 10, wherein the tube is open at the top or bottom.

12. The horizontal feed storage system of claim 1, further comprising a separator disposed between the first displacement mechanism and the second displacement mechanism configured to prevent overloading of the second displacement mechanism.

13. The horizontal feed storage system of claim 1, wherein the elongated feed container is 20-400 ft in length.

* * * * *